2 Sheets—Sheet 1.

C. M. LAKE.

LOCOMOTIVE ASH PAN.

No. 10,558. Reissued Feb. 3, 1885.

Witnesses.
John C. Perkins
John H. Chase

Inventor.
Charles M. Lake
By Lucius C. West
Atty.

N. PETERS, Photo-Lithographer, Washington, D. C.

2 Sheets—Sheet 2.
C. M. LAKE.
LOCOMOTIVE ASH PAN.
No. 10,558. Reissued Feb. 3, 1885.
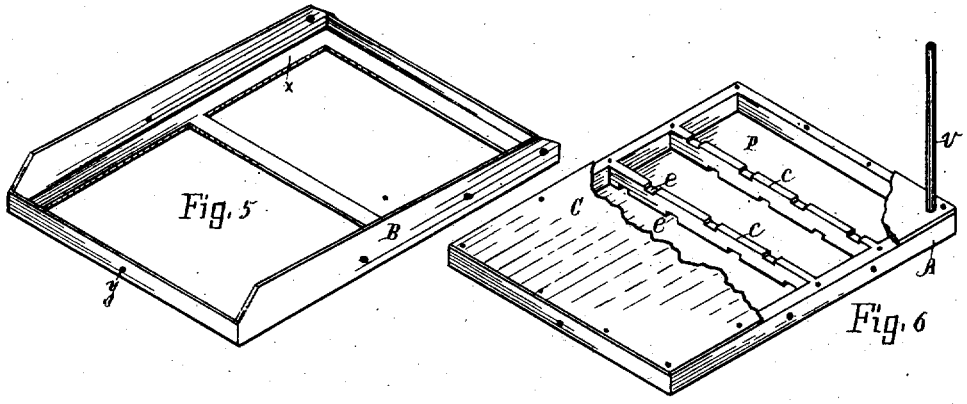
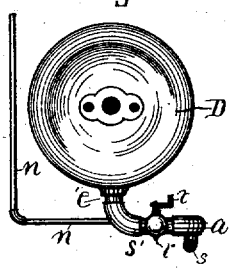
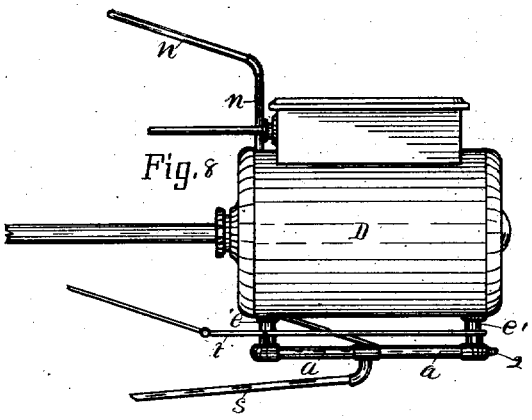
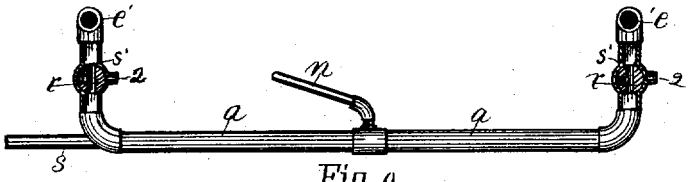
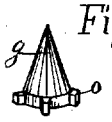
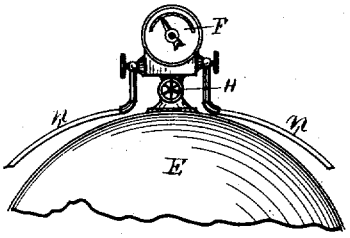
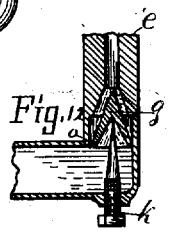
Attest.
John C. Perkins
John D. Chase
Inventor.
Charles M. Lake
By Lucien C. West
Att'y.
N. PETERS, Photo-Lithographer, Washington, D. C.

UNITED STATES PATENT OFFICE.

CHARLES M. LAKE, OF JACKSON, MICHIGAN.

LOCOMOTIVE ASH-PAN.

SPECIFICATION forming part of Reissued Letters Patent No. 10,558, dated February 3, 1885.

Original No. 302,915, dated August 5, 1884. Application for reissue filed October 7, 1884.

*To all whom it may concern:*

Be it known that I, CHARLES M. LAKE, a citizen of the United States, residing at Jackson, county of Jackson, State of Michigan, have invented a new and useful Locomotive Ash-Pan, of which the following is a specification.

My invention consists in an improved apparatus to utilize the waste-steam from the cylinders, in preventing the contents of the ash-pan from freezing, and in clearing the ash-pan of said contents. Other incidental objects appear in the description and claims, an important one of which is providing the exhaust-ports at the ends of the cylinder and their connecting-pipe with three-way cocks, for the purpose hereinafter appearing.

Figure 1:
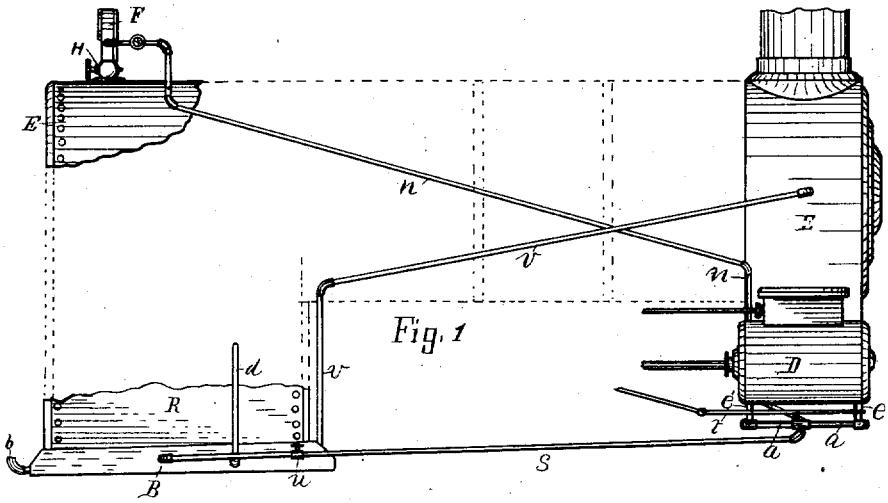
Figure 2:
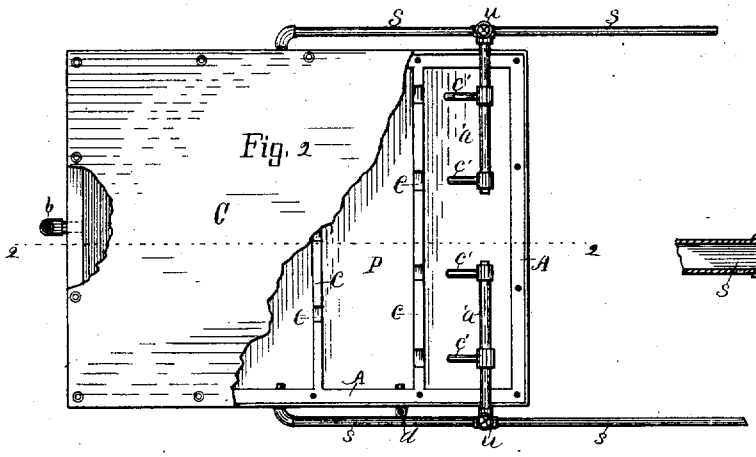
Figure 4:
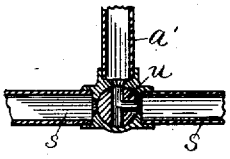
Figure 3:
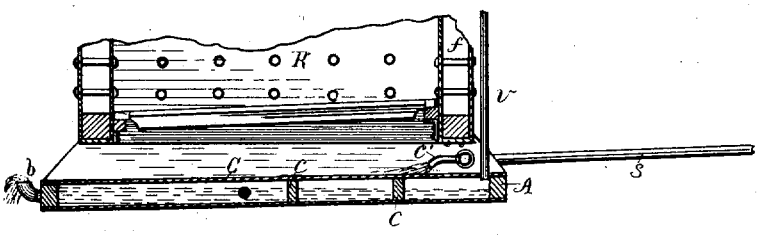

In the drawings, forming a part of this specification, Figure 1 is a side elevation of a locomotive-boiler with apparatus attached, parts being broken away; Fig. 2, a top view of the condenser-bottom to ash-pan; Fig. 3, a section of Fig. 2 on line 2 2 and a vertical broken section of the boiler-arch, with which the ash-pan is connected; Fig. 4, a broken detail of Figs. 1 and 2, in section, enlarged; Fig. 5, a perspective view of the skeleton frame of the ash-pan; Fig. 6, a perspective of the condenser-bottom to the ash-pan with parts broken away; Fig. 7, an end view of Fig. 8; Fig. 8, a side elevation of a cylinder enlarged, with connected parts broken away; Fig. 9, an enlarged top view of parts in Figs. 1 and 8; Fig. 10, an end view of the upper portion of the boiler in Fig. 1; Fig. 11, a check-valve, and Fig. 12 a section of pipe showing its location and use.

The boiler is illustrated in Fig. 1 at E, portions being in dotted lines.

D is one of the cylinders, the other being on the opposite side, in the usual manner of locomotive-engines. The exhaust-ports *e′ e′* on the under side of each end of the cylinder D are provided with three-way cocks *s′ s′*, which cocks are extended laterally toward the trucks, (trucks not here shown,) and are connected by a pipe, *a a*, Figs. 7 and 9. These cocks *s′ s′* have a passage or way leading into the cylinder, another way leading into pipe *a a*, and another way, 2, termed a "waste-port," leading out into the open air. The cocks *s′ s′* are provided with suitable plugs, *r r*, for opening and closing the ways of the cocks. A pipe, *s*, connects the pipe *a a* with the steam-condenser A. The plugs *r r* are connected by an operating-rod, *t*.

The object of the three-way cocks *s′ s′* is explained as follows: When the plugs *r r*, which have passages in them adapting them for the use intended, are set as in Fig. 9, the waste-ports 2 2 are closed, allowing the steam to pass through pipes *a a* and *s*, on into the condenser; but by turning the plugs *r r*, so as to close the passages leading into pipes *a a* and to open the waste-ports 2 2, the steam is blown out into the open air. In the ports *e′ e′* may be located check-valves *g*, Figs. 11 and 12, which will admit the passage of steam out of the ports into the three-way cocks *s′ s′* and prevent its return. The pipe *s* connects the pipe *a a* with the steam-condenser A, said condenser being located, in Figs. 1 and 3, beneath the arch or fire-place R of the boiler E. When the steam is conveyed into the condenser A, it is converted into water which keeps hot and prevents the contents from freezing in cold weather, and when thus used prevents visible exhaust-steam.

The skeleton ash-pan frame B is provided with a detachable bottom, A, said bottom being the condenser. (See Figs. 5 and 6.) This condenser consists of a frame and an upper and lower inclosure, C P, bolted to said frame. In Fig. 6 the upper inclosure, C, is broken away, showing central supports, *c c*. These supports are provided with notches *e e*, to admit the passage of steam and water all through the condenser. The steam-pipe *s* passes through the side wall of the skeleton frame B and enters the condenser A, one on each side from each cylinder, Fig. 2. Pipes *a′ a′* are connected with pipes *s s*, and extend laterally therefrom over the front end of the condenser A. These pipes *a′ a′* are provided with ports *c′ c′* for the exit of steam therefrom in blowing the contents out of the ash-pan. This is done by turning the three-way plugs *u* at the juncture of pipes *s a′*, Figs. 2 and 4, in a manner to shut the steam from entering the condenser and admitting it into pipes *a′ a′*. The condenser is provided with a discharge-spout, *b*, terminating at a proper height to govern the desired amount of water in the condenser. Draftpipes *v v* are connected with the corners of the condenser and extend to the rear of the boiler-flues and enter the smoke-box in the usual manner. The pipe *d*, Figs. 1 and 2, is designed for connection with the exhaust-pipes of a steam-propelled engine which operates the brakes in order to convey the exhaust-steam from said engine into the condenser. Thus all the exhaust-steam from the entire locomotive construction may be conveyed to the same condenser. The brake-engine and its exhaust-pipes are not here shown, the pipe *d* being extended upward and broken away. Near the front of the boiler, on top, is an indicator, F, connected with the boiler F by a heater-pipe, H. With this pipe and indicator are connected branch heater-pipes *n n*, leading from one cylinder to the other over the boiler, Figs. 1 and 10, and connecting with pipes *a a*.

The pipes H *n* near the indicator, Fig. 10, are provided with stop-cocks. When the waste-ports 2 2 of the three-way cocks are closed by the plugs *r r*, steam may be circulated from the boiler through pipes H *n a s*, to prevent danger of freezing up.

By means of the indicator the engineer can tell from the oscillation of the hand that the exhaust-ports *e′ e′* are open, as a greater circulation of steam passes through the pipes *n n* when the plugs *r r* are turned to open the ports *e′ e′*.

Having thus described my invention, what I claim as new is—

1. The combination, with a cylinder and a pipe connecting the ports, provided with three-way cocks, suitable plugs in said cocks, and check-valves, of a condenser located beneath the ash-pan, and a connecting-pipe for conveying the steam to said condenser, substantially as set forth.

2. The combination, with a cylinder having connecting-pipe between the ports, and provided with three-way cocks and suitable cock-plugs, of an ash-pan frame, detachable condenser-bottom, and pipe for conveying the exhaust-steam to the condenser, substantially as set forth.

3. The combination of an ash-pan, a condenser beneath the pan, a cylinder or cylinders, pipes connecting the cylinder exhaust-ports with condenser, three-way cocks at said ports, and branch pipes for blowing out the ash-pan, having at the juncture of the branches and pipe three-way plugs whereby steam may be let into the branches or into the condenser, substantially as set forth.

4. The combination, with the cylinders, an indicator, a pipe connecting the indicator with the boiler, and heater-pipes connecting the indicator with the cylinder exhaust-ports, of an ash-pan, condenser, and pipes connecting the exhaust-ports with the condenser, said ports provided with suitable cocks and valves, all substantially as set forth.

In testimony of the foregoing I have hereunto subscribed my name in presence of two witnesses.

CHARLES M. LAKE.

Witnesses:
WM. H. SHAKESPEARE, JR.,
JOHN H. CHASE.